United States Patent [19]

Plummer

[11] 4,102,581

[45] Jul. 25, 1978

[54] UNICELL PHOTOELECTRIC PHOTOMETER

[75] Inventor: William T. Plummer, Concord, Mass.

[73] Assignee: Polaroid Corporation, Cambridge, Mass.

[21] Appl. No.: 782,993

[22] Filed: Mar. 30, 1977

[51] Int. Cl.² .............................. G01J 1/42; H01J 3/14
[52] U.S. Cl. .................................. 356/225; 250/237 R
[58] Field of Search ....................... 356/221, 224, 225; 250/237 R, 239

[56] References Cited

U.S. PATENT DOCUMENTS

| | | | |
|---|---|---|---|
| 2,227,166 | 12/1940 | Tönnies | 356/224 |
| 2,248,758 | 7/1941 | Higonnet et al. | 250/237 R |
| 3,062,964 | 11/1962 | Lubin | 250/237 R |
| 3,134,021 | 5/1964 | Ploke | 356/225 X |
| 3,162,766 | 12/1964 | Ploke | 356/225 X |
| 3,442,191 | 5/1969 | Harvey | 356/225 X |
| 4,040,751 | 8/1977 | Baker et al. | 356/225 |

Primary Examiner—John K. Corbin
Assistant Examiner—Rolf Hille
Attorney, Agent, or Firm—Frank J. Caufield

[57] ABSTRACT

A unicell photometer of the photoelectric type having a single tilted plano-convex lens with a series of spaced prisms integrated with the plano surface to provide the photometer with different horizontal and vertical specific acceptance angles while simultaneously aiming the field of view of the photometer below the horizontal plane.

16 Claims, 11 Drawing Figures

UNICELL PHOTOELECTRIC PHOTOMETER

BACKGROUND OF THE INVENTION

1. Field of the Invention

This invention relates generally to photoelectric photometers and, more particularly to unicell photometers with an optical element for providing the photometer with different horizontal and vertical specific acceptance angles.

2. Background of the Prior Art

The use of unicell photometers for evluating scene brightnesses to predict and/or control photographic exposures is well known. Such photometers generally consist of a photoresponsive transducer and a lens element for receiving radiation from a scene and directing it onto a photosensitive surface of the transducer. The transducer, which may be either of the photovoltaic or photoresistive type, provides an output signal indicative of the radiant power incident to its photosensitive surface. The output signal from the transducer may be utilized directly to predict a photographic exposure condition or to actually control a camera's shutter and aperture settings by automatically adjusting them for the correct exposure without intervention by the photographer.

The output signal from such photometers characteristically responds in a directional manner to the influence of radiation from the various scene objects which may occupy its field of view as based on their angular field position. Consequently, the contribution which any object makes to the strength of the output signal depends, in part, on the importance or weight which is assigned to particular angular field locations by the photometer's directional response characteristic. As an example, the so-called center weighted light meter places more emphasis on objects located near the center of the picture field than on those located near its edges. Thus, in this case, a bright object will affect the output signal more when it is located on-axis than when that same object is located at some off-axis angular field position.

Angular directional response characteristics for such photometers differ one from another depending on the particular arrangement of optical elements with the photoresponsive transducer. To determine the angular directional response characteristic for a specific photometer, it is conventional to measure variations in its output signal in response to a constant output luminance source that occupies a small angular percentage of an otherwise totally dark field of view as the source is positioned at different angular field locations. From this type of measurement, it is possible to determine a generalized mathematical function which describes the relationship between the photometer's on-axis and off-axis responses. Typically, the unicell photometer has an angular directional response function which resembles a "bell-shaped" curve having a peak on-axis response which gradually decreases to zero at the edge of its field of view. For photometers which have "bell-shaped" response curves, it is apparent that the more gradual the decrease off-axis, the less the photometer will emphasize centrally located objects.

Although the angular directional response curve provides a great deal of useful and precise information about the directional performance of such photometers, it is sometimes more convenient to specify a single parameter which provides its user with an indication of the photometer's directional characteristics. Such a parameter is the specific acceptance angle which can be derived from the angular directional response curve. American National Standard General-Purpose Photographic Exposure Meters, PH 2.12, 4.2.3, defines the specific acceptance angle as "the angle in the stated directions from the optical axis of the receiver at which [a] point source must be placed to reduce the scale reading of the meter an amount corresponding to 50 percent of the original light reading when the same source was on the optical axis." From this definition, it is readily apparent that a photometer with a narrow specific acceptance angle, say on the order of a few degrees, would be classified as a "spot meter" convenient for measuring brightnesses of individual scene objects while a meter having a specific acceptance angle equivalent to, say one-half of a camera's field angle, would be characterized more as an "averaging" meter.

Again, these distinctions are important since they dictate how much importance will be placed on various scene objects in predicting exposures. What a photometer's specific acceptance angle should be depends on what kinds of scenes it will probably be used to measure. For a horizontal landscape in which the bright sky might tend to cause underexposure of the ground area, it generally is desirable to have a photometer weighted in favor of the ground in order to minimize problems with the sky. On the other hand, for an overall evenly lit scene, it is generally considered desirable to have a fairly broad specific acceptance angle so that no one object dominates; the theory being that a better average is obtained by including as much of the scene as possible. For anomolous scene conditions such as high contrast, back-lit scenes, it would be desirable to have a narrow specific acceptance angle which measured only the subject of interest. Because of the variety of scene conditions, it is clear that no one specific acceptance angle can satisfy the requirements for all scene conditions. Therefore a compromise is required which will result in the largest amount of well exposed pictures for the expected range of scene conditions. One solution which has been found satisfactory is to provide a photometer having varying specific acceptance angles, being generally broader in the horizontal plane than in the vertical plane, while simultaneously being aimed below the horizontal plane.

There are a number of prior art disclosures which are generally related to the foregoing solution. For example, U.S. Pat. No. 3,134,021 issued to M. Ploke on May 19, 1964 and entitled "PHOTOELECTRIC EXPOSURE METERS WITH LIGHT RAY LIMITERS" disclosed a photometer comprising a photocell in which a light ray limiter is positioned in front of a photocell for the purpose of reducing the acceptance angle in the vertical direction without changing the acceptance angle in the horizontal direction. U.S. Pat. No. 3,062,964 issued to Marvin Lubin on Nov. 6, 1962 and entitled "OPTICAL SYSTEMS FOR PHOTOCELLS" discloses an optical system by which the acceptance angle of a photocell is different in the vertical and horizontal directions. And in U.S. Pat. No. 2,248,758 issued to R. A. E. Higonnet et al. on July 8, 1941 and entitled "OPTICAL SYSTEM FOR REDUCING THE VIEWING ANGLE OF CERTAIN DEVICES SUCH AS PHOTOELECTRIC CELLS", the patentees disclose the use of prisms in an optical system for reducing the viewing angle of a photoelectric cell. According to this disclosure at column 2, lines 23-26, "the angles of the prisms mentioned above may be made different when it is desired to reduce the viewing angle to different values in different directions."

While the foregoing patents relate to either structure or optical arrangements for providing different horizontal and vertical "acceptance angles", meaning viewing angles, they do not teach, as the present invention does, how to selectively expand the specific acceptance angle of a photometer without appreciably altering the photometer's field of view.

Consequently, it is a primary object of this invention to provide an improved unicell photometer having different horizontal and vertical specific acceptance angles.

It is another object of this invention to provide an improved unicell photometer wherein the horizontal specific acceptance angle is broader than its vertical specific acceptance angle while the field of view in both directions is not appreciably different.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

A unicell photometer of the photoelectric type suitable for use in photographic apparatus comprising a photoresponsive transducer having a photosensitive surface thereon of predetermined dimensions. The transducer operates to provide an output response which varies in correspondence with the amount of radiant power incident to its photosensitive surface. A positive optical element of unitary construction and having a predetermined focal length is disposed about an optical axis which ultimately intersects the photosensitive surface of the transducer. The optical element is also spaced apart from the photosensitive surface by a distance different from its focal length. The optical element and the photosensitive surface of the transducer cooperate to define a field of view for the photometer such that the optical element operates to direct radiation incident thereon from the field of view towards the photosensitive surface of the transducer.

The optical element itself includes a first surface through which radiation emerges from the element such that it is converged toward the optical axis onto the photosensitive surface of the transducer; the first surface, in combination with the photosensitive surface, defines a specific acceptance angle which is substantially rotationally symmetric about the optical axis. In addition, the optical element includes a second surface positioned to directly receive radiation from the field of view. The second surface is configured to provide the photometer with specific acceptance angles which are substantially the same as the rotationally symmetric specific acceptance angle in one plane while being substantially greater than the rotationally symmetric specific acceptance angle in a plane orthogonal to the first plane. Also, means are provided for stationing the transducer and optical element in substantially light tight spaced apart relation with respect to each other.

In a preferred embodiment, the first and second surfaces of the optical element are integrally formed as a single plano-convex lens with a series of elongated spaced prisms formed integral with and parallel to the plano surface to provide the optical element with its unitary construction; the prism angles being selected so that no ray of radiation from within the field of view can undergo total internal reflection within the optical element.

In the preferred embodiment, the plano surface is also tilted with respect to the optical axis to aim the field of view of the photometer downwardly so that relatively more of the field of view is aimed below a horizontal plane than is aimed above it.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
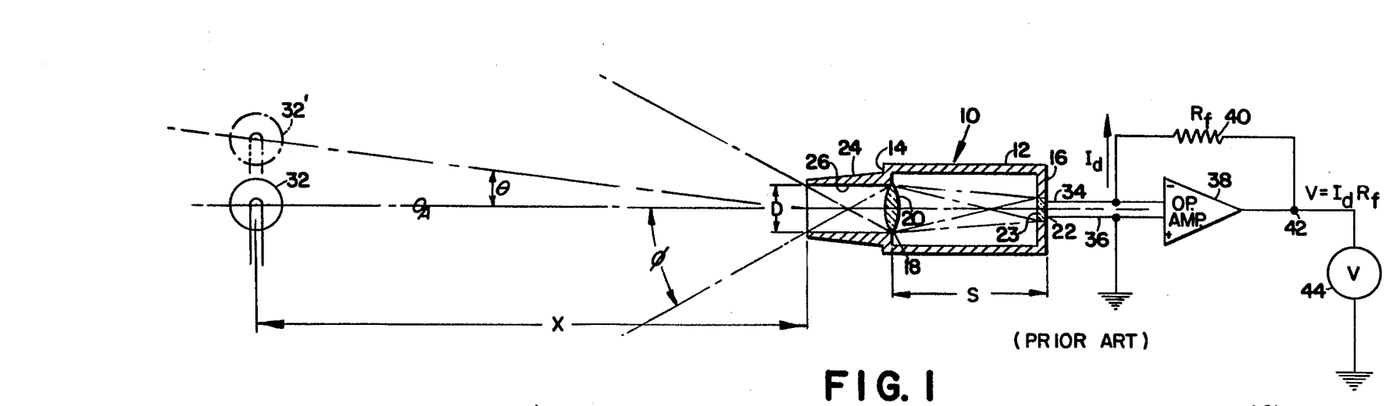
FIG. 1 is a cross-sectional view of a conventional photometer in combination with appropriate circuitry as schematically illustrated for measuring the output response of the photometer.

The directional response of a conventional photometer may be measured in the following manner. Referring now to FIG. 1 there is shown an arrangement through which the directional response for a simple unicell photometer 10 may be measured in a manner as is well known in the art. The photometer 10 is symmetrical about its optical axis, $O_A$, so as to provide a rotationally symmetrical directional response. The photometer 10 includes a housing section 12 having forward and rear walls 14 and 16 respectively. The forward wall 14 has an aperture 18 in which is centered a positive, double convex lens 20 for receiving radiation and directing it towards a photosensitive transducer 22 located along the optical axis $O_A$ and centered in the rear wall 16. The lens 20 is spaced apart from the photosensitive transducer 22 by a distance, S, which is greater than the focal length of the lens 20 thereby placing the photometer 10 in a class of unicell photometers which are generally referred to as "defocused".

The photosensitive transducer 22 may be either of the photovoltaic or photoresistive type although the following description will be hereinafter limited to a transducer of the photovoltaic type. The photovoltaic transducer 22 thus responds to radiation incident on its photosensitive surface 23 by providing a current, $I_d$, which is proportional to the radiant power contained in the incident radiation. In addition, the photovoltaic transducer 22 preferably provides a uniform response over its surface such that the electrical response per unit area of the photosensitive surface 23 to a unit of incident flux remains constant regardless of position on the surface.

The lens 20 in combination with the photovoltaic transducer 22 cooperatively define a field of view for the photometer 20, which field of view may be diagramatically illustrated by the semifield angle $\phi$. The size of the field of view depends upon the focal length of the lens 20, the separation distance, S, between the lens 20 and transducer 22, and the size of the photosensitive surface 23 of the photodetector 22.

Concentric to the lens 20 and extending outwardly from the forward wall 14, there is provided a cylindrical flarehood as shown generally at 24. The flarehood 24 operates to preclude stray or indirect radiation emanating from outside the field of view from entering the interior of the housing 12. The interior of the flarehood 24 defines a cylindrical surface 26 of diameter D which extends longitudinally through the flarehood 24. The diameter, D, is a sufficient dimension so that the flarehood 24 does not interfere with the field of view. In addition, the interior of the housing 12 may be provided with any well known materials for absorbing any stray radiation not blocked by the flarehood 24.

The data required to calculate the directional response of the photometer 10 is obtained by first placing a constant intensity light source 32 at some distance, X, forward of the photometer and on the optical axis $O_A$, and then measuring the variation in the electrical response of the transducer 22 as the light source 32 is moved within the field of view of the photometer 10 to different angular locations along a plane perpendicular to the optical axis $O_A$. The size of the light source 32 is chosen so that the angle subtended by the source is substantially small in comparison to the semifield angle $\phi$ of the photometer. The intensity of the light source 32 is selected so that the minimum intensity of radiation incident to the transducer 22 always remains above its minimum level of detectivity. In addition, the remainder of the field of view is maintained dark in order to insure that the output of the transducer 22 is due solely to the radiation received from the light source 32 and not from any other potential background illumination.

Figure 2:
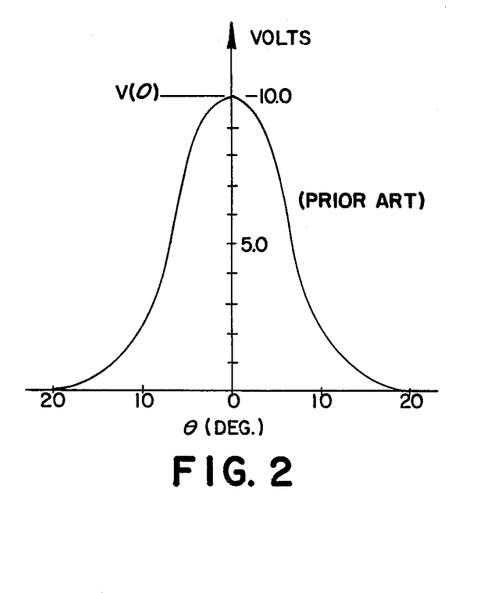
FIG. 2 is a graphical representation for the directional response curve of the photometer of FIG. 1.
Figure 3:
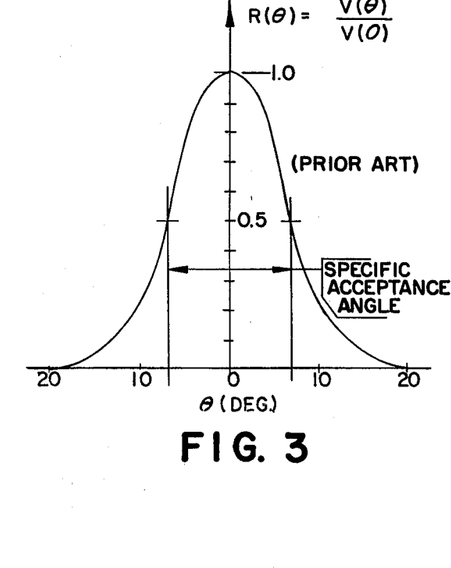
FIG. 3 is a graphical representation of the normalized directional response curve of FIG. 2.

The photovoltaic transducer 22 is provided with a pair of output leads 34 and 36 which respectively connect to an appropriate circuit for measuring the electrical response of the transducer 22. The measuring circuit includes a high gain operational amplifier 38 having a pair of input terminals which connect respectively to the output leads 34 and 36 from the transducer 22. The operational amplifier 38 includes an output lead 42 which connects by way of a feedback resistor 40 to the output lead 34 from the transducer 22. A voltmeter 44 may be connected to the output lead 42 to provide a measure of the photovoltaic response from the transducer 22. Thus, as the light source 32 is moved along the plane perpendicular to the optical axis $O_A$ to different angular field locations, such as that designated as $\theta$, the output voltage from the transducer 22 will vary in accordance with the graph of FIG. 2 to provide the directional response of the photometer 10. Characteristically, the directional response will be in the form of a bell-shaped curve having a peak on-axis response, $V_O$, which decays to 0 when $\theta$ equals the semifield angle $\phi$. Although the output response from the photovoltaic transducer 22 will change as a function of the intensity of the light source 32, it is readily apparent that this will have no impact on the general shape of the directional response curve for the photometer 10 provided the magnitude of the incident radiation is maintained within the linear response range for the transducer 22. Thus, the graph of FIG. 2 completely characterizes the directional response of the photometer 10 within its range of linear response. The directional response of the photometer 22 as graphically illustrated in FIG. 2 may be normalized as a non-dimensional function for all intensities of illumination of the light source 32 by graphing the ratio of the off-axis voltage response $V(\theta)$ of the transducer 22, to the on-axis voltage response $V(O)$ of the transducer 22 as shown in FIG. 3. Thus, the graph of FIG. 3 illustrates a directional response for the photodetector 10 as normalized with respect to the on-axis peak response $V(0)$.

Based on the previously referenced American National Standard definition of specific acceptance angle, it is readily apparent that the specific acceptance angle for the photometer 10 may be directly derived from its normalized directional response as shown in FIG. 3. Based on the information illustrated in FIG. 3, it can be seen that the specific acceptance angle of the photometer 10 is approximately 14° because the response of the photodetector 22 is reduced to 50 percent of its on-axis response when the source 32 is located at an off-axis field location, $\theta$, which is approximately 7°.

Figure 4:
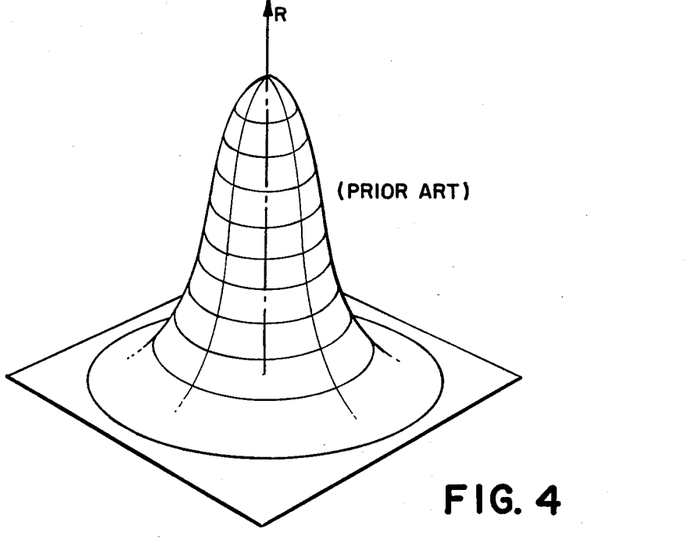
FIG. 4 is a three-dimensional graph of the curve of FIG. 3.

Whereas the geometry of the photometer 10 is rotationally symmetric about its optical axis $O_A$, its directional response and specific acceptance angles are also rotationally symmetric. Thus, a three-dimensional graph may be plotted for the directional response to the photometer 10 as shown in FIG. 4 whereby the volume enveloped by the three-dimensional graph corresponds to the output signal from the transducer for a uniformly backlit or bright scene.

The directional response of a photometer may thus be defined as that mathematical function that describes the relationship between the on-axis and off-axis responses of a photometer to a light source that occupies a small percentage of an otherwise totally darkened field as the source is positioned at different angular locations in the field. As such the directional response of a photometer provides an indication of what portion of the total output response from the photometer is directly attributable to various objects scattered throughout the field of view. The relative significance of any particular object within the field of view with respect to that portion of the photometer's output response directly attributable to the object is a direct function of that object's angular field position and its luminous intensity. The concept of specific acceptance angle, as we have seen, is a convenient way of describing the directional response of a photometer by using a single parameter so that a user may quickly compare the relative characteristics of two different photometers or more clearly understand more precisely what a particular photometer is measuring. The specific acceptance angle for any photometer may be derived from its normalized directional response curve in the manner described above.

Figure 5:
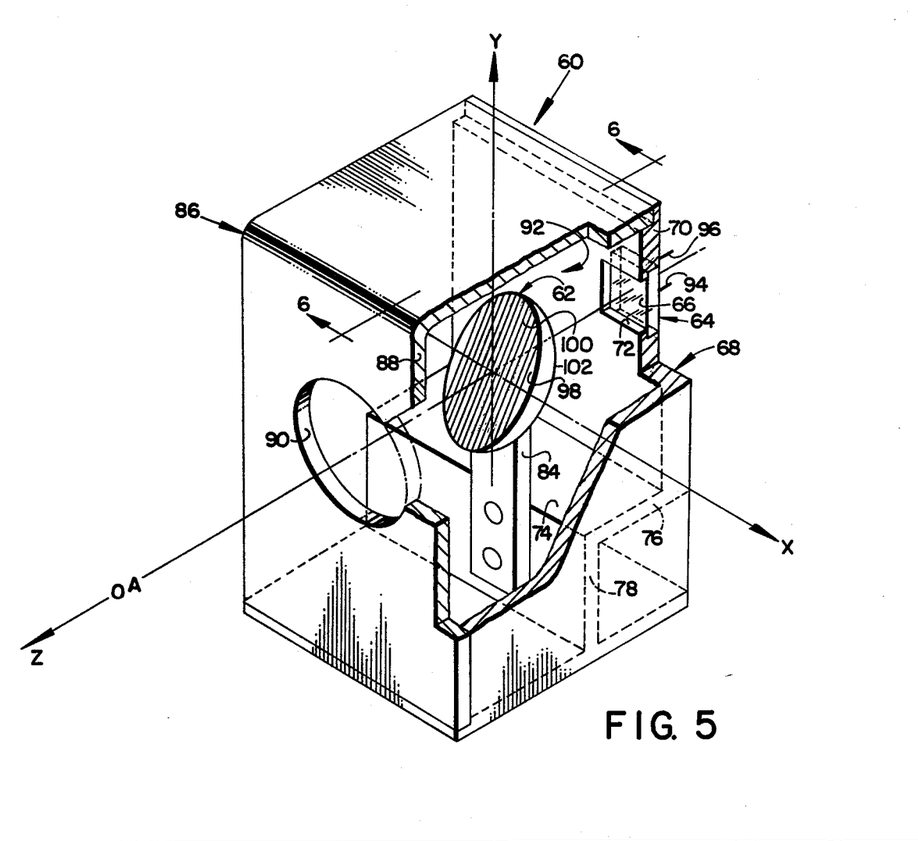
FIG. 5 is a perspective view of the photometer of this invention with parts broken away.
Figure 6:
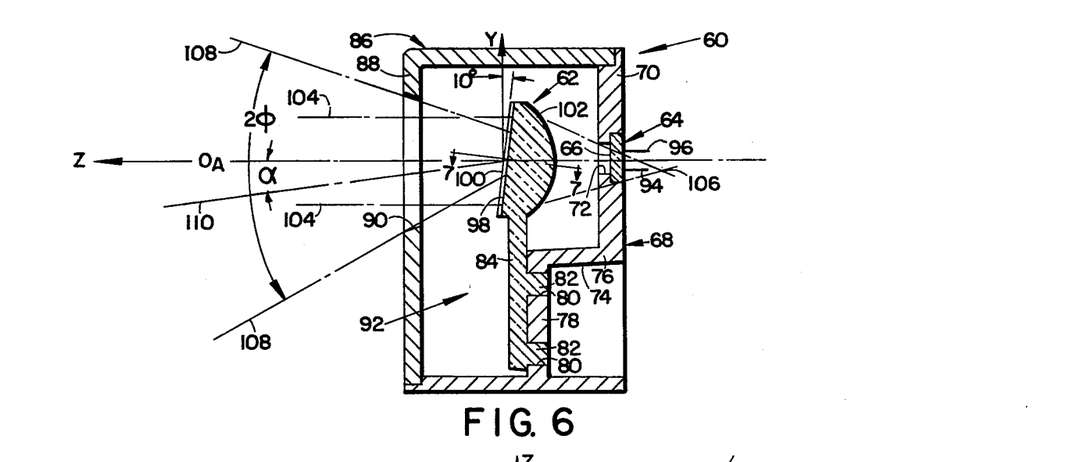
FIG. 6 is a cross-sectional view of the photometer of FIG. 5 taken along line 6—6 in FIG. 5.

Referring now to FIGS. 5 and 6, there is shown generally at 60 the unicell photometer of this invention arranged with respect to a mutually orthogonal X, Y, Z coordinate system. The photometer 60 comprises optical means in the form of positive optical element 62 which is disposed about an optical axis, OA, identical with the Z-axis. Spaced apart from the optical element 62 is a photoresponsive transducer 64 having a photosensitive surface 66 of predetermined dimensions which faces the optical element 62 in position to receive radiation emanating therefrom.

The optical element 62 is preferably molded as a single piece from a suitable optical plastic material such as acrylic, styrene, or styrene-acrylonitrile, or the like so as to ease its manufacturability and reduce its cost.

A support member 68 is provided as a means for stationing the optical element 62 and the transducer 64 in a predetermined spaced apart relation with respect to each other. In the arrangement shown, the support member 68 includes a rear wall 70 having an aperture 72 arranged along the optical axis. The aperture 72 is structured to receive the transducer 64 so that it is mounted in alignment therewith. A stepped shelf 74, formed by a generally horizontal wall 76 and a vertical wall 78, is provided for mounting the optical element 62 in alignment with the transducer 64. In this respect, the vertical wall 78 includes a pair of spaced apart holes 80 configured to receive therein a pair of complementary configured spaced apart bosses 82 which extend rearwardly from a vertical leg 84 of the optical element 62. The support member 68 may be formed of any suitable dimensionally stable material in a well known manner but is preferably fabricated as a metal casting. The bosses 82 and the holes 80 are preferably dimensioned for a press fit so that the rear surface of vertical leg 84 is firmly held against the front surface of the vertical wall 78 when assembled.

Additionally shown is an opaque cover member 86 which includes a forward wall 88 having a beveled aperture 90 therein. The front cover member 86 and the support member 68 are adapted to assemble with one another to define an interior light tight chamber 92 for excluding unwanted ambient light. Radiation from the scene to be measured is admitted into the light tight chamber 92 via the aperture 90. With this arrangement, means have been provided for stationing the transduc 64 and the optical element 62 in substantially light tight spaced apart relation with respect to each other. Moreover, the combined arrangement for stationing the optical element 62 and the transducer 64 optically associates the optical element 62 with the photosensitive surface 66 so that the two, in combination, define the angular field of view of the photometer 60. It is to be understood that the aperture 90 may be positioned and configured so as to limit or not limit the field of view of the photometer 60 and operates to exclude selected stray or unwanted radiation originating outside the field of view from entering the light tight chamber 92.

It will be readily understood that the structural arrangement of the photometer 60 may comprise any portion of a camera shutter housing in which may be disposed an automatic shutter mechanism and associated electronic control circuitry (not shown) in a well known manner. In this respect, the transducer 64 includes a pair of output leads 94 and 96 which may extend to the exterior of the photometer 60, as shown, to be connected with any suitable circuit such as that illustrated in FIG. 1.

As previously discussed, the transducer 64 is preferably of the photovoltaic type and, more specifically, may comprise a silicon photodiode which has the advantage of relatively fast response time, low memory, excellent linearity, together with ready adaptability to convenient shapes and sizes. In addition, the spectral sensitivity of silicon may be readily controlled by appropriate color correction filters (not shown) to provide a photopic sensitivity.

Figure 7:
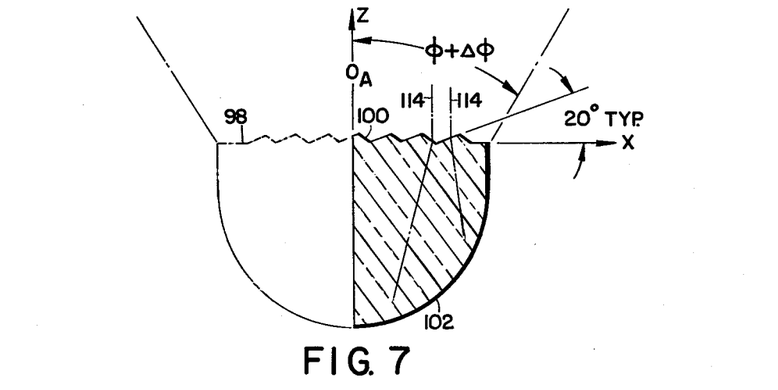
FIG. 7 is a cross-sectional view of the optical element of the photometer of FIG. 5 taken along line 7—7 in FIG. 6 with sections shown in phantom.

Referring now more particularly to the optical element 62, as shown in FIGS. 5, 6 and 7, it can be seen that it comprises a plano surface 98 that is tilted at an angle of ten degrees with respect to the X–Y plane. Integrally formed with the tilted plano surface 98 is a plurality of elongated spaced prisms 100 arranged with their longest major dimensions parallel with the tilted plano surface 98. The major dimensions of each of the prisms 100 extend to the peripheral edges of the plano surface 98 as best shown in FIG. 1. By contrast, the prisms 100 extend along the X-axis to a predetermined distance which is smaller than the width of the plano surface 98 as best illustrated in FIG. 7. Thus arranged, the tilted plano surface 98 with the prisms 100 collectively define a surface for directly receiving radiation from the field of view of the photometer 60 to introduce such radiation into the optical element 62.

The optical element 62 further comprises a convex rear surface 102, preferably spherical, arranged concentrically with the optical axis, OA, from which radiation emanates towards the transducer 64.

The various surfaces of the optical element 62 cooperate to provide it with a focal length which is longer than the spacing between it and the transducer 64 thus classifying the photometer 60 as "defocused". This is best illustrated with reference to FIG. 6 wherein is shown a pair of rays 104, parallel with the optical axis, OA, which are brought to a focus point 106 located behind the transducer 64 and slightly below the optical axis, OA.

The optical element 62 thus operates to collect radiation from within the field of view of the photometer 60 and direct it towards the photosensitive surface 66; the rear convex surface 102 generally operating to converge rays emanating therefrom towards the optical axis, OA, as they proceed to the photosensitive surface 66.

Figure 8:
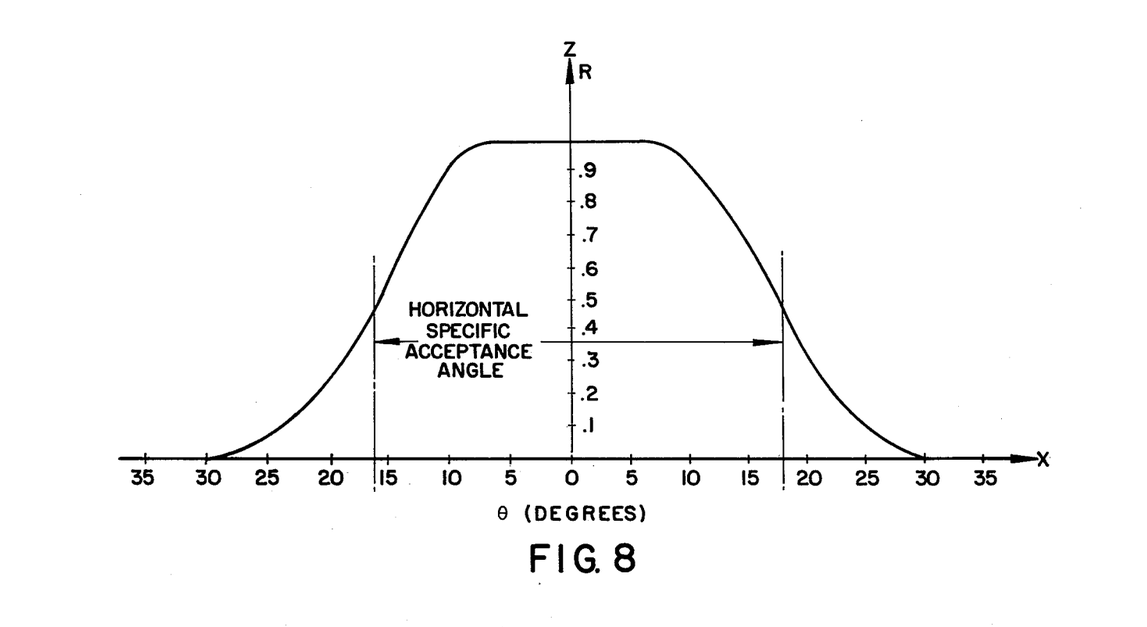
FIG. 8 is a graphical representation of the normalized directional response curve for the photometer of FIG. 5 as measured in the X-Z plane of FIG. 5.
Figure 9:
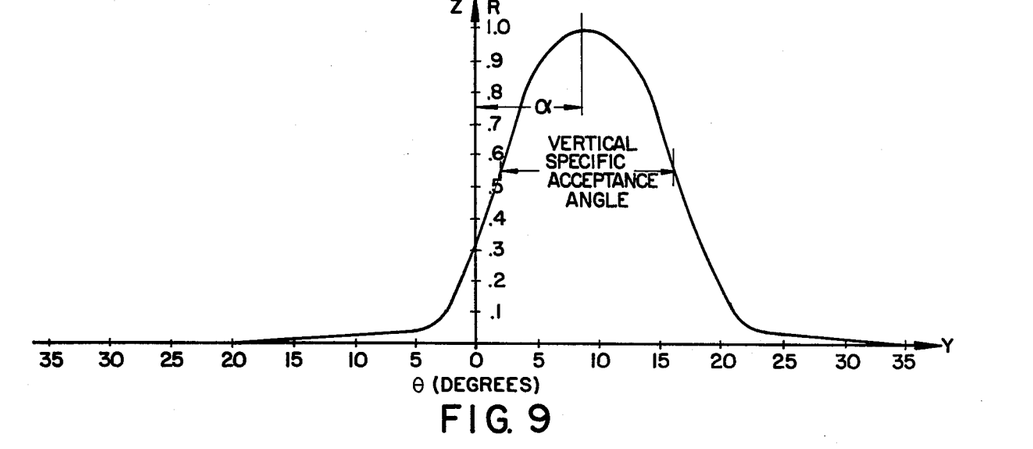
FIG. 9 is a graphical representation of the normalized directional response curve for the photometer of FIG. 5 as measured in the Y-Z plane of FIG. 5.

The features of the photometer 60 and in particular those of the optical element 62 provide the photometer 60 with specific acceptance angles which differ as measured in mutually orthogonal planes. Referring now to FIGS. 8 and 9, there is shown the normalized angular directional response curves and corresponding specific acceptance angles for the photometer 60 as measured in a horizontal plane corresponding to the X–Z plane (FIG. 8) and a vertical plane which corresponds to the Y–Z plane (FIG. 9). It is readily apparent that the horizontal specific acceptance angle is substantially greater than the vertical specific acceptance angle. It is also seen that the vertical angular directional response curve is shifted or displaced by an angle, $\alpha$, such that the peak response does not occur on the optical axis. This indicates that more of the field of view of the photometer 60 is aimed below the horizontal plane than is aimed above it. This appears more graphically in FIG. 6 wherein the field of view in the vertical plane is designated by the angle $2\phi$ subtended by a pair of extreme field rays 108. Also illustrated there is a ray 110 which intersects the optical axis, $O_A$, at the angle, $\alpha$. The angular direction of peak response of the photometer 60 is along the direction of the ray 110 which is approximately at the center of the vertical angular field.

The horizontal field of view of the photometer 60 designated in FIG. 7 by the semi-field angle, $\phi + \Delta\phi$, is slightly larger than its vertical field angle as is also readily apparent by comparing "zero" response points on the horizontal and vertical normalized angular response curves of FIGS. 8 and 9 respectively.

To summarize, the photometer 60 has been provided with a horizontal specific acceptance angle which is substantially greater than its vertical specific acceptance angle while the fields of view have been maintained nearly equal in both planes.

Figure 10:
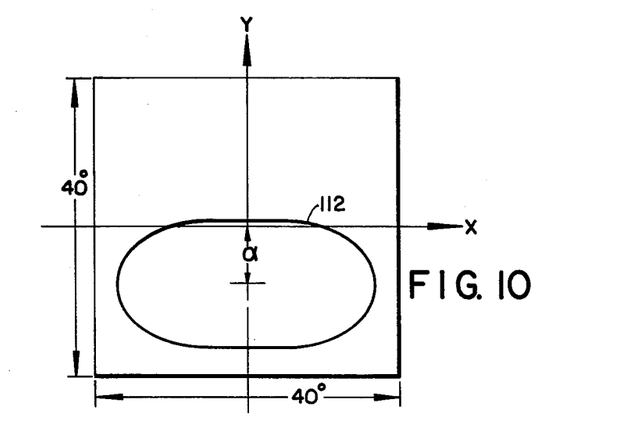
FIG. 10 is a graphical plot of the specific acceptance angles of the photometer of FIG. 5 superimposed on an illustrative camera's field of view.

Reference is now made to FIG. 10 where there is shown a two dimensional plotted closed curve 112 which shows a locus of points that represent all of the specific acceptance angles of the photometer 60 as measured in planes which are continuously rotated about the optical axis. For purposes of illustration, the curve 112 has been superimposed on a 40° square field which may represent a camera's field of view with which the invention might be used. The boundaries of the curve 112 represent the 50 percent response points of the photometer 60 and indicate the area in the 40° square field from which most of the photometer's output would be taken; objects appearing inside of the closed curve 112 would be given a relative weight of 50 percent and above while those outside would be less important in determining exposure.

The optical element 62 provides the directional response characteristics of the photometer 60 in the following manner.

The rear convex surface 102 refracts radiation entering the optical element 62 such that rays emanating therefrom converge toward the optical axis as they proceed to the transducer 64. The photosensitive surface 66 of the transducer 64 and the rear convex surface 102, in combination, operate to define a specific acceptance angle of predetermined value which is substantially rotationally symmetric with respect to the optical axis, $O_A$. The plurality of elongated spaced prisms 100 refract rays received thereon in a manner which alters the rotationally symmetric specific acceptance angle so that the final specific acceptance angles vary from a maximum value in the horizontal plane to a minimum value in the vertical plane; the minimum value being substantially the same as the predetermined value of the rotationally symmetric specific acceptance angle while the maximum value is substantially greater than it. The prisms 100, in effect, alternately refract rays of radiation so that they travel along different paths as illustrated, for example, by the rays 114 in FIG. 7. In this manner, the prisms 100 generally redistribute radiant energy from within the field of view so that it is scattered more or less toward the extreme edges of the photosensitive surface 66. The net effect of this redistribution is a general suppression of the on-axis response with an increase in the off-axis response except in the vertical plane where the prisms 100 are substantially ineffective.

Figure 11:
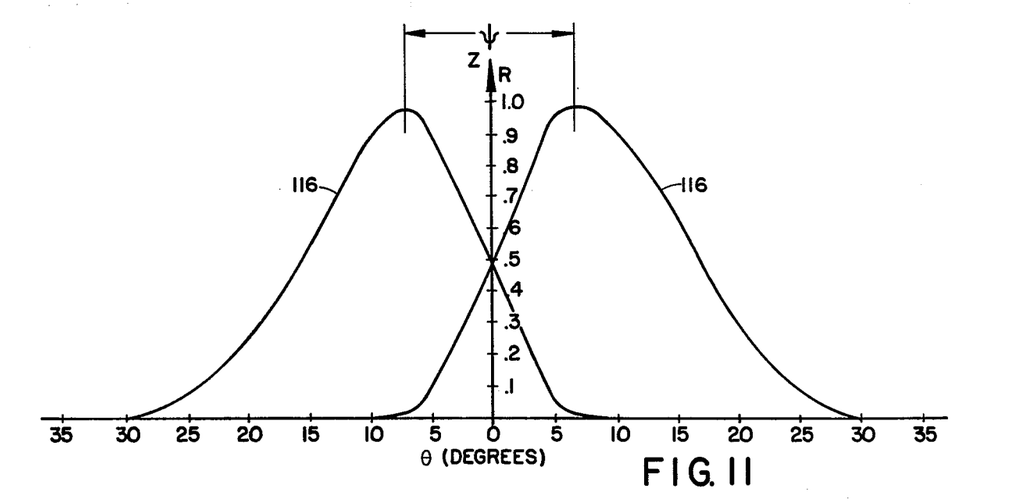
FIG. 11 is a graphical representation of the normalized component parts of the directional response curve of FIG. 8.

Another way of visualizing the effect of the prisms 100 may be had with reference to FIG. 11. In this figure, there is shown two separated normalized angular directional response curves, 116, for the horizontal plane. These curves are obtained by first blackening every other facet of the prisms 100 and then making response curve measurements as previously indicated. This procedure is then repeated with the opposed facets blackened while the first blackened facets are clear. The curves thus generated can be thought of as the component parts of the horizontal normalized response curve of FIG. 8 which when added together produce the curve of FIG. 8. It can be seen that the peak responses of the curves 116 of FIG. 11 are separated by an angle, $\psi$, which is related to the prism angle of each of the prisms 100 which in the preferred embodiment are typically 20° (see FIG. 10). The separation angle $\psi$ may be enlarged by enlarging the prism angles of the prisms 100. However, it is to be understood that the prism angles of the prisms 100 are to be selected so that no total internal reflection can occur within the optical element 62 since too great a prism angle would operate to limit the field of view of the photometer 60 rather than to generally broaden the specific acceptance angle where operable. Those skilled in the art will readily understand how to calculate the critical prism angle in this regard.

Also, as was previously pointed out, the prisms 100 do not extend across the full width of the plano surface 98 along the X-axis. In this respect the prisms 100 do not substantially extend the field of view of the photometer 60 in the horizontal plane.

The tilted plano surface 98 provides a means for aiming the field of view so that more of it is aimed below the horizontal axis than above. In this respect, the tilted plano surface 98 operates as an optical wedge to generally deviate the paths of travel of rays of radiation incident thereto through a predetermined angle.

Certain changes may be made in the above described embodiment without departing from the scope of the invention. For example, the plano surface 98 may be perpendicular to the optical axis, OA, rather than tilted. This would provide a vertical field of view symmetrical with respect to the optical axis, i.e. $\alpha$ would be zero. Those skilled in the art may make still other changes according to the teachings of the present invention. Therefore, it is intended that all matter contained in the above description or shown in the accompanying drawings shall be interpreted as illustrative and not in a limiting sense.

What is claimed is:

1. A photometer of the photoelectric type for use in photographic apparatus, said photometer comprising:
   a photosensitive transducer having a photosensitive surface of predetermined dimensions, said transducer operating to provide an output response which varies in correspondence with the amount of radiant power incident on said photosensitive surface;
   optical means disposed about an optical axis which ultimately intersects said photosensitive surface of said transducer, for optically cooperating with said predetermined dimensions of said photosensitive surface to define a field of view for said photometer, said optical means including:
   (a) a first surface through which scene radiation emerges from said optical means, said first surface being configured to converge said radiation emerging from said optical means toward said optical axis onto said transducer, said transducer and said first surface of said optical means, in combination, defining a specific acceptance angle which is substantially rotationally symmetric about said optical axis, and (b) a second surface positioned to receive radiation from said field of view of said photometer and to introduce said radiation into said optical means, said second surface configured to provide the photometer with specific acceptance angles which are substantially the same as the specific acceptance angle defined by said transducer and said first surface of said optical means, in combination, in one plane while being substantially greater than the specific acceptance angle defined by said transducer and said first surface of said optical means, in combination, in a plane substantially orthogonal to said first plane; and means for stationing said transducer and said optical means in substantially light tight, spaced apart relation with respect to each other.

2. The photometer of claim 1 wherein said second surface comprises a plurality of elongated spaced prisms each of which includes a major dimension parallel to said one direction and having prism angles selected so that no ray of radiation from within said field of view of said photometer can undergo total internal reflection within said optical means.

3. A photometer of the photoelectric type for use in photographic apparatus, said photometer comprising:

a photosensitive transducer having a photosensitive surface of predetermined dimensions, said transducer operating to provide an output response which varies in correspondence with the amount of radiant power incident on said photosensitive surface;

optical means disposed about an optical axis which ultimately intersects said photosensitive surface of said transducer, for optically cooperating with said predetermined dimensions of said photosensitive surface to define a field of view for said photometer, said optical means including:

(a) first means for refracting rays of radiation received therein in a manner such that refracted rays of radiation emanate from said first means toward said transducer and simultaneously converge toward said optical axis, said first refracting means in cooperation with said transducer defining a specific acceptance angle of predetermined value which is substantially rotationally symmetric with respect to said optical axis, and (b) second refracting means for receiving radiation from said field of view of said photometer and for providing said photometer with a specific acceptance angle greater than said predetermined value of said substantially rotationally symmetric specific acceptance angle with respect to radiation received in a horizontal plane through said optical axis while simultaneously providing said photometer with a specific acceptance angle whose value is substantially the same as said predetermined value of said substantially rotationally symmetric specific acceptance angle with respect to radiation received in a vertical plane through said optical axis and perpendicular to said horizontal plane, said second refracting means further being operative to provide said photometer with a plurality of specific acceptance angles progressively varying from a maximum value with respect to radiation received in said horizontal plane to a minimum value with respect to radiation received in said vertical plane, said second refracting means comprising a plurality of elongated spaced prisms each of which includes a major dimension parallel to said vertical plane, said spaced prisms defining a surface so as to directly intercept radiation from said field of view of said photometer and having prism angles selected so that no ray of radiation from within said field of view of said photometer can undergo total internal reflection within said optical means; and means for stationing said transducer and said optical means in substantially light tight, spaced apart relation with respect to each other.

4. The photometer of claim 3 wherein said optical means comprises a single optical element of unitary construction.

5. The photometer of claim 3 wherein said stationing means further includes means for defining an aperture therein through which radiation may enter said photometer to impinge upon said optical means, said aperture being positioned along said optical axis forward of said surface defined by said spaced prisms.

6. The photometer of claim 3 wherein said first and second refracting means are integrally formed as a single plano-convex lens of predetermined focal length with said spaced prisms formed integral with said plano surface to provide a unitary construction for said optical means, said plano surface being located in a plane perpendicular to said optical axis.

7. The photometer of claim 6 wherein said plano and convex surfaces of said plano-convex lens are rotationally symmetric with respect to said optical axis.

8. The photometer of claim 6 wherein the distance by which said transducer and said lens are spaced apart is different from the length of said predetermined focal length of said lens.

9. The photometer of claim 8 wherein said major dimension of each of said spaced prisms extends vertically to the peripheral edges of said plano surface of said lens while said spaced prisms extend horizontally across said plano surface to a predetermined distance smaller than the width of said plano surface as measured in said horizontal plane.

10. A unicell photometer of the photoelectric type for use in photographic apparatus, said photometer comprising:

a photosensitive transducer having a photosensitive surface of predetermined dimensions, said transducer operating to provide an output response which varies in correspondence with the total amount of radiant power incident on said photosensitive surface;

optical means disposed about an optical axis thereof, which optical axis ultimately intersects said photosensitive surface of said transducer, for optically cooperating with said predetermined dimensions of said photosensitive surface to define a field of view for said photometer and for directing radiation from within said field of view onto said photosensitive surface of said transducer, said optical means including:

(a) first means for refracting rays of radiation received therein in a manner such that refracted rays of radiation emanate from said first means toward said transducer and simultaneously converge toward said optical axis, said first refracting means in cooperation with said transducer defining a specific acceptance angle of predetermined value which is substantially rotationally symmetric with respect to said optical axis, (b) second refracting means for receiving radiation from said field of view of said photometer and for providing said photometer with a specific acceptance angle greater than said predetermined value of said substantially rotationally symmetric specific acceptance angle with respect to radiation received in a horizontal plane through said optical axis while simultaneously providing said photometer with a specific acceptance angle whose value is substantially the same as said predetermined value of said substantially rotationally symmetric specific acceptance angle with respect to radiation received in a vertical plane through said optical axis and perpendicular to said horizontal plane, said second refracting means further being operative to provide said photometer with a plurality of specific acceptance angles progressively varying from a maximum value with respect to radiation received in said horizontal plane to a minimum value with respect to radiation received in said vertical plane, said second refracting means comprising a plurality of elongated spaced prisms each of which includes a major dimension parallel to said vertical plane, said spaced prisms defining a surface so as to directly intercept radiation from said field of view of said photometer and having prism angles selected so that no ray of radiation from within said field of view of said photometer can undergo total internal reflection within said optical means, and (c) means for aiming said field of view of said photometer downwardly so that relatively more of said field of view is aimed below said horizontal plane than is aimed above said horizontal plane, said aiming means comprising means for deviating the paths of travel of each ray of radiation incident thereto through a predetermined angle as it emerges therefrom; and means for stationing said transducer and said optical means in substantially light tight, spaced apart relation with respect to each other.

11. The photometer of claim 10 wherein said optical means comprises a single optical element of unitary construction.

12. The photometer of claim 10 wherein said stationing means further includes means for defining an aperture therein through which radiation may enter said photometer to impinge upon said optical means, said aperture being positioned along said optical axis forward of said surface defined by said spaced prisms.

13. The photometer of claim 10 wherein said first and second refracting means and said aiming means are integrally formed as a single tilted plano-convex lens of predetermined focal length with said spaced prisms formed integral with said tilted plano surface to provide a unitary construction for said optical means, said tilted plano surface being positioned in a plane which forms a predetermined angle with respect to a plane normal to said optical axis, said major dimensions of each of said spaced prisms being parallel with said tilted plano surface.

14. The photometer of claim 13 wherein said convex surface of said tilted plano-convex lens is concentrically disposed about said optical axis.

15. The photometer of claim 13 wherein the distance by which said transducer and said lens are spaced apart is different from the length of said predetermined focal length of said lens.

16. The photometer of claim 15 wherein the said major dimensions of each of said spaced prisms extends to the peripheral edges of said tilted plano surface while said spaced prisms extend horizontally across said tilted plano surface to a predetermined distance smaller than the width of said tilted plano surface as measured in said horizontal plane.

* * * * *